(12) United States Patent
Groll et al.

(10) Patent No.: US 7,805,531 B2
(45) Date of Patent: Sep. 28, 2010

(54) CONTENT FILTERING SYSTEM FOR A MOBILE COMMUNICATION DEVICE AND METHOD OF USING SAME

(75) Inventors: Neil Groll, Woollahra (AU); Meg Dennis, Newtown (AU)

(73) Assignee: Agent Mobile Pty Ltd (AU)

( * ) Notice: Subject to any disclaimer, the term of this patent is extended or adjusted under 35 U.S.C. 154(b) by 102 days.

(21) Appl. No.: 11/997,987

(22) PCT Filed: Jun. 30, 2006

(86) PCT No.: PCT/AU2006/000921

§ 371 (c)(1),
(2), (4) Date: Feb. 5, 2008

(87) PCT Pub. No.: WO2007/019599

PCT Pub. Date: Feb. 22, 2007

(65) Prior Publication Data

US 2009/0132718 A1    May 21, 2009

(30) Foreign Application Priority Data

Aug. 12, 2005  (AU) ............................. 2005100653

(51) Int. Cl.
*G06F 15/16* (2006.01)
(52) U.S. Cl. .................... 709/229; 709/217; 709/219
(58) Field of Classification Search .............. 709/229, 709/217, 219
See application file for complete search history.

(56) References Cited

U.S. PATENT DOCUMENTS

| | | | |
|---|---|---|---|
| 5,832,212 A | 11/1998 | Cragun et al. | |
| 7,089,594 B2 * | 8/2006 | Lal et al. | 726/31 |
| 2003/0063072 A1 | 4/2003 | Brandenberg et al. | |
| 2004/0003097 A1 * | 1/2004 | Willis et al. | 709/228 |
| 2005/0015453 A1 | 1/2005 | Chin et al. | |
| 2005/0090230 A1 | 4/2005 | Liao et al. | |
| 2005/0114794 A1 * | 5/2005 | Grimes et al. | 715/840 |
| 2006/0015900 A1 * | 1/2006 | Cezeaux et al. | 725/40 |

(Continued)

FOREIGN PATENT DOCUMENTS

EP    1524611 A2    4/2005

(Continued)

OTHER PUBLICATIONS

Do et al., Web Mining for Cyber Monitoring and Filtering, Dec. 1-3, 2004, Proceedings of the IEEE Conference on Cybernetics and Intelligent Systems, pp. 399-404.

(Continued)

*Primary Examiner*—Kenny S Lin
(74) *Attorney, Agent, or Firm*—Brooks Kushman P.C.

(57) ABSTRACT

A method of controlling access to content from a mobile client device, the mobile client device being communicably connected to a server device via a communication link, and the method including the steps of: (i) receiving in the mobile client device, an input indicative of the content; (ii) thereafter, processing the received input, wherein said processing includes the mobile client device determining if the received input meets an access criteria, whereby, the mobile client device selectively provides access to the content if the access criteria is determined to have been met.

42 Claims, 6 Drawing Sheets

U.S. PATENT DOCUMENTS

2006/0095396 A1* 5/2006 Ostrover .................. 707/1

FOREIGN PATENT DOCUMENTS

JP          2002-44254 A     2/2002

OTHER PUBLICATIONS

Reid, The Rise of Third Generation Phones: The Implications for Child Protection, Jun. 2005, Information & Communications Technology Law, vol. 14, No. 2, pp. 89-113.

Puresight Product Description, Puresight for Mobile Operators, Aug. 2004, Retrieved Aug. 25, 2008 from http://web.archive.org/web/20050204225553/http://icognito.com/products/ps-mobile.shtml.

Puresight Press Release May 26, 2005: "bcgi to Acquire PureSight, Inc. to Further Enhance Content Filtering Capabilities of bcgi Mobile Guardian", retrieved Aug. 25, 2008 from http://web.archive.org/web/20060318001206/www.icognito.com/news/pr-20050526.shtml.

Puresight Press Release Aug. 5, 2004: "Advanced Content Filtering System for Mobile Operators Launches", retrieved Aug. 25, 2008 from http://web.archive.org/web/20041222155456/www.icognito.com/news/pr-20040805.html.

International Search Report for International Application No. PCT/AU2006/000921.

* cited by examiner

CONTENT FILTERING SYSTEM FOR A MOBILE COMMUNICATION DEVICE AND METHOD OF USING SAME

TECHNICAL FIELD

The present invention relates to a method and system for filtering content sent and/or received via a mobile communication device such as a mobile telephone.

BACKGROUND OF THE INVENTION

Traditionally, the filtering of Internet content and the like which is accessible on mobile communication devices such as mobile phones is conducted by server-side devices located at the carrier service provider which connects the mobile communication devices to the Internet.

Unfortunately, this approach to content filtering has been problematic in that server-side filtering requires substantial processing power. For instance the server-side device is required to inspect data packets and decide at that point whether to deny access to the content, or to let it through. Where the server-side device is simultaneously providing content filtering functionality for a large number of phones, the resources are stretched even further and may introduce unacceptably long delays.

SUMMARY OF THE INVENTION

The present invention seeks to alleviate at least one of the problems described above in relation the prior art.

The present invention involves several different broad forms. Embodiments of the invention may include one or any combination of the different broad forms herein described.

In a first broad form, the present invention provides a method of controlling access to content from a mobile client device, the mobile client device being communicably connected to a server device via a communication link, and the method including the steps of:

(i) receiving in the mobile client device, an input indicative of the content;
(ii) thereafter, processing the received input, wherein said processing includes the mobile client device determining if the received input meets an access criteria, whereby, the mobile client device selectively provides access to the content if the access criteria is determined to have been met.

Preferably, the content includes human-readable content.

Typically, the received input includes a user-entered input such as a User Request Link (URL) or IP address of an Internet web site which is requested for viewing by a user on the mobile client device. Thus, for instance, when a user enters an IP address or URL into the address bar of a web browser running on the mobile client device, the IP address may constitute a "received input" which is indicative of a web site containing human-readable content identified by the URL or IP address.

The received input may also include text strings received by the mobile client device via the communication network in response to a URL request sent from the mobile client device—that is, the text strings received by the mobile client device in this instance may include text from the web site identified by the IP address requested by the user. In this instance, the text strings may constitute both the received input as well as the human-readable content itself.

The received input may also include text strings which are entered into the mobile client device when a user is composing an SMS and/or e-mail message. The text strings may be received into the mobile client device via an SMS or e-mail messaging application respectively.

The received input may yet also include cookies or scripts associated with pop-up applications that may be downloaded into the mobile client device. Typically, the cookie or script includes text strings which may be processed by the mobile client device using the access criteria to determine if the pop up may be enabled on the mobile client device.

It would be apparent to a person skilled in the art that the received input may also include titles of audio, image and/or video files intended for use with a broad range of applications including for instance Instant Messaging, Video streaming, and MMS. Typically, the titles may take the form of text strings. Thus for instance, when a user enters the name of a song into an audio player application running on the mobile client device, and, the title of the song may serve as the received input which once again may also be screened by reference to the access criteria to determine if access to the actual song contents should be enabled from the mobile client device. The titles of video and image files may be processed in a similar fashion.

The communication network may typically include a wireless network such as, but not limited to, a packet-switched mobile network whereby human-readable content that is exchanged between the client device and server device are formatted into discrete packets for transmission in accordance with the TCP/IP protocol and/or higher level protocols such as HTTP, FTP, SMTP, WAP and so on. Typically, the mobile client device is communicably connected to the Internet via the communication network so as to enable access to a range of Internet web sites. The communication network may also allow for packet data to be transported in accordance with any number of wireless bearer protocols such as GPRS, GSM, 3G. CDMA, WiFi, WiMax and the like.

Typically, the mobile client device includes a mobile phone, PDA or the like having a processor, an operating system executable on the processor, and, a memory store for storing a client-side application executable on the processor to perform at least some of the method steps in accordance with the first broad form of the present invention. Typically, the client-side application may include multiple functional aspects. It may include a browser to enable user-access to web sites via a WAP gateway. The browser may also serve as a convenient interface for a user to interact with the server device—this may be the case for instance when the user is first registering to use the client-side application and seeks to submit a registration form for processing by the server device. The client-side application may also include a means of inspecting data packets at the TCP/IP level as they are being received or sent from the mobile client device. Typically, an application "hook" may be used to inspect a header portion of a packet to identify an IP address or URL of a web site being requested for viewing by the user. The IP address or URL may thereafter be processed by reference to the access criteria to determine if access to the web site in question should be enabled or disabled. The client-side application may also include a plug-in running in conjunction with the browser, whereby the plug-in may be adapted to facilitate communication between the client-side application and the server device. The plug-in may also be responsible for applying the access criteria to received user inputs to determine for instance if access to a particular web site indicated by an entered IP address of URL should be provided or denied, and if necessary, the plug-in may initiate a request to the server device to assist in this determination.

Typically, the server device includes a processor, an operating system executable on the processor, and, a memory store for storing a server-side application executable on the processor. The server-side application may be adapted to communicate with the client-side application resident on the mobile client device via the communication network. Typically, the server device may include at least one database for storing server-side information. The server device may also include a WAP gateway which provides the mobile client device with access to Internet web sites.

Preferably, in step (ii) of the first broad form, when determining if the received input meets the access criteria, at least one of the following steps may be implemented:

(I) determining if the received input matches an entry in an allowed content list, whereby if the received input does match an entry in the allowed content list, then access is enabled to the human-readable content indicated by the received input via the mobile client device. Typically, the allowed content list is stored in the mobile client device. Preferably, the allowed content list may be user-definable—that is, the user may be able to selectively add or remove URLs, IP address and/or text strings as entries in the allowable content list as desired; and (II) determining if the received input matches an entry in a disallowed content list, whereby, if the received input does match an entry in the disallowed content list, then access is disabled to the human-readable content indicated by the received input data via the mobile client device. Typically, if the received input does match an entry in the disallowed list, a message is displayed on the mobile client device advising the user that access has been denied. Typically, the disallowed content list is stored in the mobile client device. Preferably, the disallowed content list may also be user-definable; and (III) determining if the received input matches an entry in a client-side active list indicative of content that has been accessed relatively recently on the mobile client device, wherein each entry in the client-side active list may include at least one of the following:
  (a) a URL or IP address of a recently accessed web site; and
  (b) a content profile associated with the URL or IP address;
  (c) a timestamp indicative of the time at which the web site was last accessed;
  wherein, if the received input matches the URL or IP address in an entry in the client-side active list, and the content profile associated with that entry is allowable by reference to a pre-defined user access setting, then access to the human-readable content indicated by the received input may be enabled. Typically, the client-side active list may also be stored in the mobile client device. Preferably, the client-side active list may also be user-definable; and (IV) the mobile client device querying the server device, wherein in response to the query, the server device is adapted to:
  (a) receive the input indicative of human-readable content from the mobile client device; and
  (b) determine if the received input matches an entry in a server-side list, wherein each entry in the server-side list may include at least one of the following:
    (i) a URL or IP address of a web site; and
    (ii) a content profile associated with the URL or IP address;
  wherein, if the received input matches the URL or IP address in an entry in the server-side list, and the content profile associated with that entry is allowable by reference to the pre-defined user access setting, then access to the human-readable content indicated by the received input is enabled on the mobile client device.

Preferably, the steps (I) to (IV) are applied in numerical order. Also preferably, if in implementing step (I) above, it is determined that the received input matches an entry in the allowed content list, then access is provided to the human readable content regardless of whether access would be denied in accordance with any one of steps (II)-(IV). Typically, steps (II)-(IV) are not required to be performed once it is determined in accordance with step (I) that access is to be enabled.

Preferably, at least steps (I) to (II) are performed by the client mobile device.

Preferably, step (II) is implemented if the received input is not matched to an entry in the allowed content list in accordance with step (I). If in implementing step (II) above, it is determined that the received input matches an entry in the disallowed content list, then access is denied to the human readable content regardless of whether access would be enabled in accordance with any one of steps (III)-(IV). Typically, steps (III)-(IV) are not required to be performed once it is decided in accordance with step (II) that access be denied.

Preferably, step (III) is implemented if the received input is not matched to an entry in the disallowed content list in accordance with step (II). If in implementing step (III) above, it is determined that the received input matches an entry in the client-side active list, then access is enabled to the human readable content. Also preferably, in step (III), in order for access to be enabled to the human-readable content, the received input may be required to not only match an entry in the client-side active list, but may also be required to match an entry having a time-stamp falling within a predefined time period. For instance, and by way of example only, if the received input consists of an IP address entered by the user, and, if the client-side active list contains an entry matching the requested IP address, then a further determination may be made as to whether the timestamp of that entry falls within the predefined time period—for instance, within the past 30 days. Preferably, if this is not the case, then step (IV) is implemented. Also preferably, step (IV) may be implemented when the received input does not match any entries in the client-side active list at all.

Preferably, the client-side active list may be adapted to store up to a maximum of 100 entries. Typically, the client-side active list may be stored within a cache of the mobile client device. In certain embodiments, the cache may also store web site data associated with each entry in the client side active list. Typically, whenever a web site has been successfully accessed by the mobile client device, the client-side active list may be inspected to determine if the web site URL or IP address is already contained in the list. Typically, if the URL or IP address is not contained in an entry in the list, or, if an entry in the list does contain the URL or IP address but the timestamp of the entry falls outside the predefined time period (eg. 30 days), then the mobile client device queries the server device for a content profile for the URL or IP address in question. Typically, if the mobile client device queries the server device for a content profile on a recently accessed web site, but the server device is unavailable, then as a default procedure, the mobile client device may create a new entry in the client side active list for the recently accessed web site with an "unclassified" content profile assigned to it.

Typically, when the client side active list reaches its limit of 100 entries, the entry in the client-side active list having the oldest existing time stamp associated with it may be discarded and the most recently accessed web site details may be stored in to the list in its place.

Preferably, the server device may be adapted to dynamically update the client-side active list whenever a content profile for a given web site has been updated on the server device and the web site also has a corresponding entry in the client-side active list. Typically, the update may be "pushed" to the mobile client device by the server device to effect the update. Typically, the server device may be required to maintain a log of entries currently stored in client-side active lists for each mobile client device connected to the server device so that updates can be pushed to appropriate mobile client devices accordingly.

Preferably, the content profile of a particular web site may be defined by reference to at least one content rating within a predetermined set of content ratings. For instance, the content ratings which may potentially be assigned to the web site may include the ratings "G", "M", "MA", "R" and unclassified (a default rating when no classification is available). Content ratings may be based on a suitable content classification scheme operating in the user's country. For instance, in Australia it may be appropriate to adopt the same content rating scheme which is used in relation to censorship of online content as administered by the Australian Broadcasting Authority. The content profile may further, or alternatively, be defined by reference to at least one content category within a predetermined set of content categories. For instance, the content categories may include News, Sport, Weather, Banking, Gambling, Adult Entertainment, and General.

By way of example only, the content profile for the Internet search engine www.google.com may be assigned a content rating of "G" as well as a content category of "General" which reflects the general purpose nature of the web site for all age groups. In contrast, the web site www.playboy.com may have a content profile with a content rating of "R" and a content category "Adult Entertainment" in order to reflect the risque nature of the web site. Typically, for each entry in the server-side list and/or the client-side active list, fields representing each of the available content categories or content ratings are flagged with either a "Yes" or "No" to indicate which content categories or content ratings are applicable to the web site in question.

Typically the server-side list may be stored in a first database of the server device. The server-side list may be compiled and/or updated by manually inspecting various Internet web sites accessible via the communication network and then arbitrarily defining a content profile for each inspected web site. For instance, the web site www.espn.com may be associated with both the sport category as well as the "G" content rating. It is envisaged that content profiles for web sites may be defined by proprietors of the web site or web site content providers themselves. Alternatively, a central administrator may be required to compile the server-side list by assigning content profiles to web sites.

Thus, in steps (III) or (IV), the content profile associated with a web site entry in the server-side list or the client-side active list may be allowable by reference to the user access setting if:

(i) the assigned content rating(s) of the content profile corresponding to a user-requested web site are permitted by reference to the user access setting; and/or (ii) the assigned content category(s) of the content profile corresponding to a user-requested web site are permitted by reference to the user access setting.

Preferably, before content filtering may be enabled by the client-side application running on the mobile client device, at least one of the following steps may be required:

(a) installing the client-side application on the mobile client device; and/or (b) registering an account in respect of the client-side application installed on the mobile client device; and/or (c) submitting a fee in exchange for using the client-side application; and/or (d) defining a user access setting.

Preferably, the step of installing the client-side application on the mobile client device may be performed by downloading the application into the device typically from the server device. The application may be downloaded using at least any one of the following:

a WAP-enabled link;
a Web-enabled link;
an Infra-red-enabled link;
a Bluetooth-enabled link;
a PC cable.

The client-side application may typically be around 300 KB in size such that it may be downloaded relatively efficiently in any one of the above ways. The client-side application may be periodically upgraded by the server device which may be adapted to automatically "push" software upgrades to the mobile client device via the communication network from for installation as the need arises.

Preferably, step (b) may involve the user being required to register an account with the server device before receiving authorisation to use the client-side application. For instance, the client-side application may be rendered inoperable until the registration is successfully processed by the server device, and, the server device subsequently unloads a key to the client mobile device to allow operation of the client-side application. Typically, the account may be set up by completing and submitting a registration form to the server device via a WAP browser interface running on the mobile client device, or alternatively, via a Web browser of any PC terminal that may be connected to the server device.

The registration form may prompt the user to enter personal details such as his/her name, date of birth, address and contact details. The user may also be prompted to submit information which may enable the server device to verify an age of the user—and in particular, to verify that the user's age is at least 18 years old. Typically, the age-verification information may include the user's credit card details which may be used by the server device to cross-check the age of the user against the records of a credit agency such as VISA™, Mastercard™ and so on. Typically, upon submission of the credit card details, the server device may effect the processing of the payment transaction so that the user is thereafter authorised to use the content filtering mechanism of the client-side application.

Typically, in step (c) the user is able to, via the Web browser interface of the mobile client device or any PC terminal, define a user-access setting which is to be submitted to the server device for storage. The user-access setting may be defined in a similar manner as described above in respect of the content profiles of client-side active list entries—that is, the user access setting may have one or more content rating fields flagged, and/or, one or more content category fields flagged to reflect the extent of access to content on the client mobile device that may be available to the user.

Typically the user access setting may be stored in both the mobile client device and/or in a second database of the server device. For instance, the user access setting may be submitted to the server device for storage at the time of registration.

Typically, the present invention may allow for multiple user access settings to be defined and selectively applied to the mobile client device at any given time. Typically, up to 4 different user access settings may be defined. Typically, the user registering the new account may define each of the 4 possible user access settings.

Preferably, registration to use the present invention and/or the step of defining the different user access settings may be performed by an administrator. Typically, the administrator may be automatically designated as the user that registers the account with the server device. By way of example, the administrator may, be a parent responsible for 4 "child" users of a single mobile phone. Thus, the parent may seek to selectively control, to varying degrees, the type of online content which each of the 4 child users may be able to access content via the mobile client device.

Where the administrator is less that 18 years of age, the user-access settings are automatically defined to reflect a default setting—that is, the default setting may limit access to content to "G" rated and/or "General" category content for all users of the mobile client device. The server device may signal the client-side application to enforce the default user-access settings at the time of registration if the administrator's age cannot be verified as being above the age of 18.

Each user access setting may also have its own allowed and disallowed list associated with it on a single mobile client device. Typically, the user may, with authorisation from the administrator edit it's respective user access setting. Typically, a password protection scheme may be implemented to enable the administrator to selectively prevent any one of the 4 possible users from editing certain aspects of their respective user access settings. For instance, the administrator may only allow for users to edit their respective allowed content and disallowed content files whilst disabling user editing of the content profiles of their user access settings—for instance, disabling the ability of a user to include "R" rated content for viewing in its content profile when the user is under the age of 18.

The password protection scheme may be implemented both on the mobile client device itself to prevent unauthorised editing of user-access settings by a person other than the administrator. Users who are not the administrator may also be provided with password protected access to their user-access settings so as to be able to selectively edit them within the limits set down by the administrator.

The present invention may also include the step of programming the mobile client device to automatically trigger operation one of the user-access settings programmed in to the mobile client device based on a time of day. This may be particularly advantageous for instance where a business seeks to apply a filtered profile related to work access to the Internet during the working week between 9 am to 5 pm, whilst, allowing for less restrictive more user-access setting to apply outside of business hours.

Typically, the present invention may also include the step of providing a "black list" and/or a "white list" of web sites. Typically, white and black lists are not editable by the user, and, are typically not made visible to the user. Typically, the black-list and/or white-list may only be edited by a server-side device administrator. Also typically, the black list and white list may be stored into the mobile client device and may be queried before the access criteria is applied to a received input.

In particular, the black-list may include a list of web sites that are never able to be accessed from the mobile client device at any time regardless as to whether such web-sites are included in the allowed content list(s).

The white list may include a list of web sites which are always accessible to users even if included in the disallowed content list(s), but not if referred to in the black list. Typically, the white list is hard-coded into the client-side application such that when the client-side application is installed on the mobile client device, the white list is readily accessible during content filtering.

In certain embodiments, when the access criteria is applied to a received input to determine if access should be enabled to the human readable content from the mobile client device, then before the received input against the allowed and disallowed content lists, the received input may first be compared against the white and/or black lists.

In a second broad form, the present invention provides a processing system adapted for performing the method steps in accordance with the first broad form of the present invention.

BRIEF DESCRIPTION OF THE DRAWINGS

The present invention will become more fully understood from the following detailed description of a preferred but non-limiting embodiment thereof, described in connection with the accompanying drawings, wherein.

MODES FOR CARRYING OUT THE INVENTION

In the following, the operation of a first embodiment of the present invention will be described by reference to FIGS. 1 to 4. For simplicity, FIG. 1 provides a schematic diagram of only those network elements which are relevant to explaining how the embodiment is implemented, but it would be appreciated by a person skilled in the art that other embodiments may also includes other network elements that need not be described herein.

Figure 1:
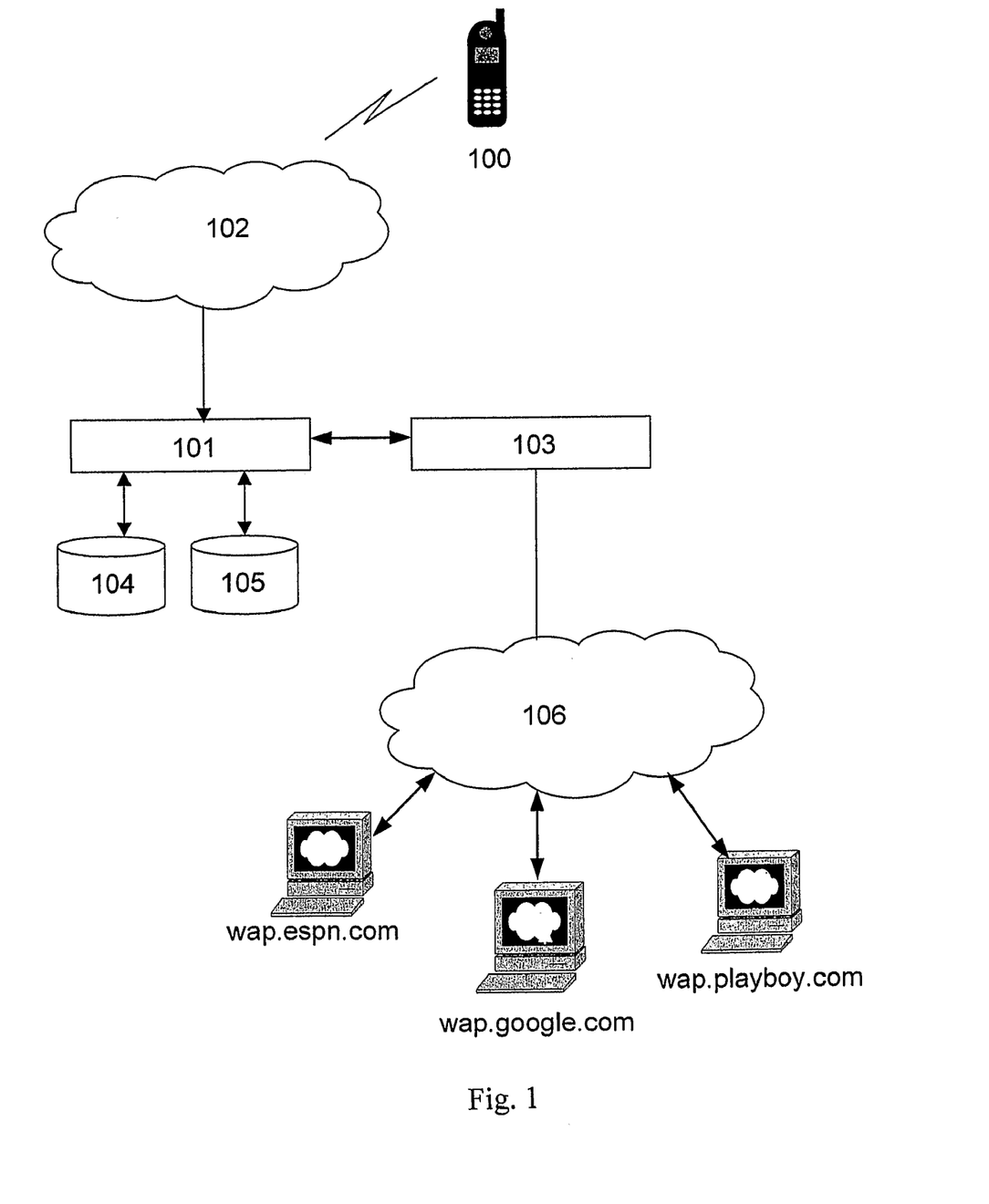
FIG. 1 shows a schematic diagram of a mobile phone communicably connected with a server device and WAP server in accordance with a first embodiment of the present invention.

In FIG. 1 a mobile phone (100) is shown communicably connected with a server device (101) via a packet-switched mobile network (102). The server device (101) includes a WAP gateway (103) so that the mobile phone (100) is able to receive Internet web content via the gateway (103). The server device (101) also includes a first and second database (104, 105) for storing server-side information. Content is transmitted between the server device (101) and the mobile phone (100) in accordance with the TCP/IP protocol and/or higher level protocols such as HTTP, FTP, SMTP, WAP and the like.

The mobile phone (100) includes a microprocessor, a Symbian operating system executable on the processor, and, RAM for storing a client-side application executable on the processor to perform method steps in accordance with the first embodiment.

The client-side application includes a browser interface to allow the user to interact with the Internet (106) via a WAP gateway (103). The client-side application also includes a "hook" which is able to inspect packet data received by or sent from the mobile phone (100) at the TCP/IP level—that is, the application is able to determine an IP address or URL of a user-requested Web site by inspecting packet. The client-side application is also able to inspect human-readable content such as text that is sent to the mobile phone (100) from the Internet (106) upon request by a user. The client-side application also includes a plug-in which allows the client side application to interface with the server device (101) for instance when querying the server device (101). The plug-in also performs content filtering by determining if inputs received into the mobile phone (100) representing for instance IP addresses or URL of web sites requested for viewing by the user, or, text received by the mobile phone (100) in response to a user request, should be provided for access by the user.

The server device (101) also includes a microprocessor, an operating system executable on the processor, and RAM for storing a server-side application executable on the processor. The server-side application is adapted to communicate with the client-side application plug-in running on the mobile phone (100) via the packet-switched mobile network (102). The server side application is adapted to perform certain functions such as responding to mobile phone (100) queries for a content profile of a particular web site.

Figure 2A:
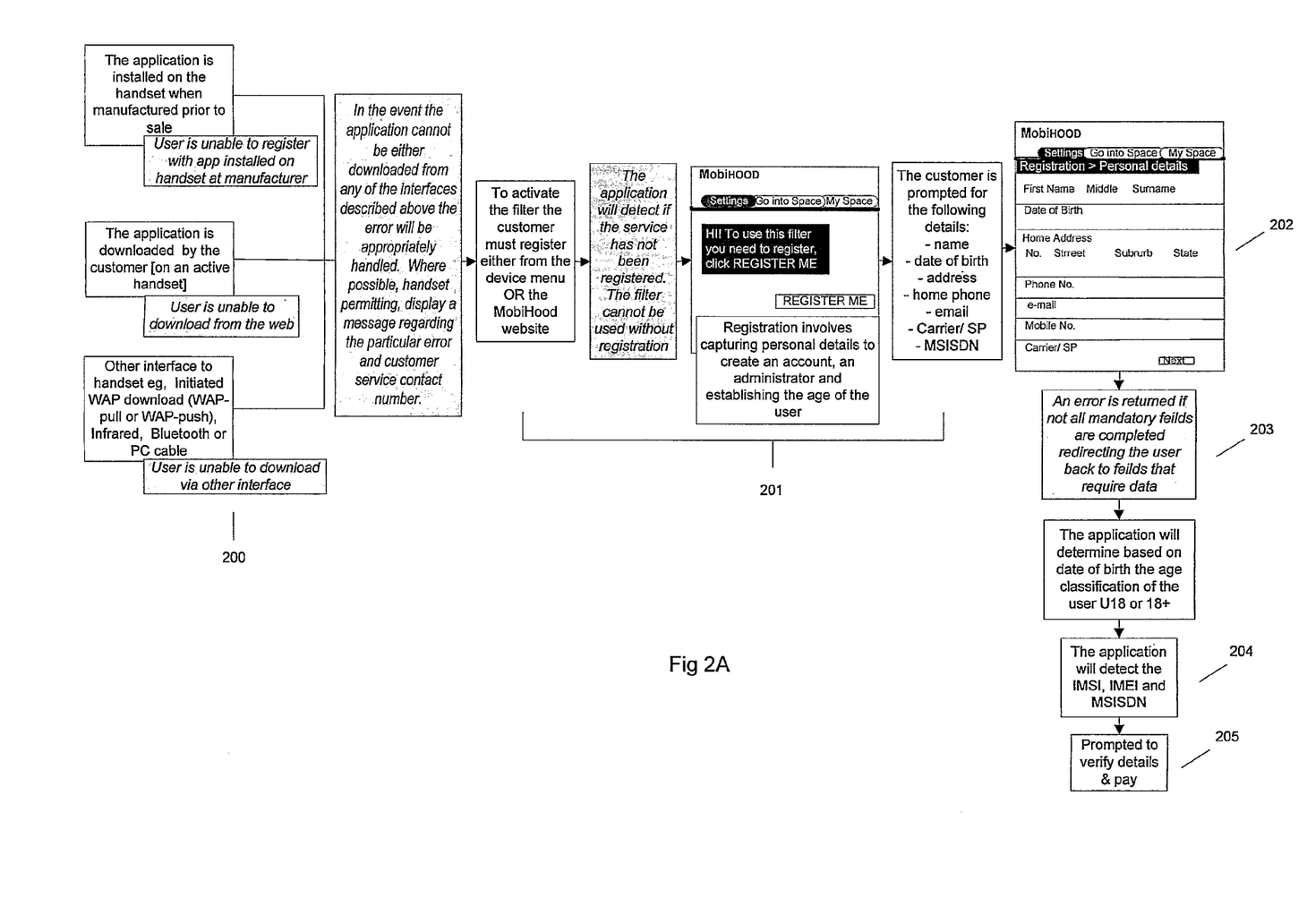
FIG. 2A shows a flow diagram of a first set of steps required in registering the client side application of the first embodiment.

To commence using the content filter of the first embodiment, the client-side application is firstly downloaded into the mobile phone (100) from the server device (101) as indicated at block (200) in FIG. 2. This is achieved either by the user initiating a download of the software using a WAP browser interface running on the mobile phone (100), or, by logging into an Internet web site and requesting that the client-side application be "pushed" to the mobile phone (100) handset via the WAP gateway (103).

Upon receiving the user's request to send the client-side application, the server device (101) effects download of the client-side software to the mobile phone (100). The client-side application content-filtering functionality is inoperable until the user submits a registration form to the server device (101) whereby a new account is created for the user. The user that registers the new account is automatically designated as the "administrator" for all user-access settings which are applicable to the mobile phone (100). The client-side application is fully operational once the server device (101) has successfully processed the registration, has set up the account and received payment of a fee for registering. Only then will the server device (101) transmit an electronic key to the client-side application which will enable the application to become fully operational.

As indicated at block (201) of FIG. 2A, registration involves the administrator being prompted to enter the following personal details into an online form displayed on the browser of the client-side application. The personal details that are required to be submitted include the administrator's:

company or business name;
full name;
age and date of birth;
home address;
mobile phone number;
e-mail address;
an identity of the carrier service provider.

An example screenshot of the registration form that is used to submit the administrator's personal details is shown at block (202).

Once the registration form is submitted to the server device (101) by the administrator, the server device (101) stores the personal details into a new user account in the second database (105) of the server device (101). If any mandatory information fields of the registration form have not been completed properly by the administrator, then an error message is displayed to the user via the browser interface as indicated at block (203).

The client-side application will also detect the IMSI, IMEI and MSISDN numbers associated with the mobile phone (100) and transmit this information to the server device (101) with the registration form data to be stored in the second database (105) with the relevant account information. This step is indicated at block (204). The IMSI, IMEI and MSISDN numbers can later be used by the server device (101) to identify a particular mobile phone (100) that it is communicating with it. This is useful for instance where the server device (101) is required to periodically push updated content profiles to mobile phones having entries stored in their client-side active lists.

When the administrator's personal details have been submitted to the server device (101) and processed, the administrator's account is initialised. However, the administrator is still required to effect payment of a fee before the account is fully registered as indicated at block (205). In this embodiment, to effect payment, the administrator submits his/her credit card details including the credit card number, the card type, the name of the cardholder, and an expiry date.

The server device (101) proceeds to process payment of a fee for use of the client-side application. The nominal fee in this embodiment is $10.00 and this fee will be charged on a monthly basis using the submitted credit card details of the administrator. If payment of the fee is unsuccessfully processed, then an error message is sent from the server device (101) to the client-side application to be displayed to the user.

The credit card details are also used by the server device (101) to verify the age of the administrator. This is effected by cross-referencing the credit card details with records made available from the respective credit agency—for instance, VISA, Mastercard, American Express and so on. If the administrator's age is verified as being at least 18 years old or above then the administrator is entitled to set the user-access settings freely. If the age of the administrator cannot be verified as being at least 18 years old, then the scope of the administrator's control over user access settings for the mobile phone (100) will be restricted and default settings will be implemented. The significance of the user access settings will be described later in further detail.

If payment of the registration fee is successful, the administrator is then prompted via the browser to set-up a suitable username and corresponding password to enable the administrator to control access to user access settings on the mobile phone (100). This step is indicated by block (206) in FIG. 2B. The administrator is required to select a username and password each having at between 6-10 alphanumeric characters. An example screenshot of the browser when it prompts the user to enter a username and password is shown at block (207).

Figure 2B:
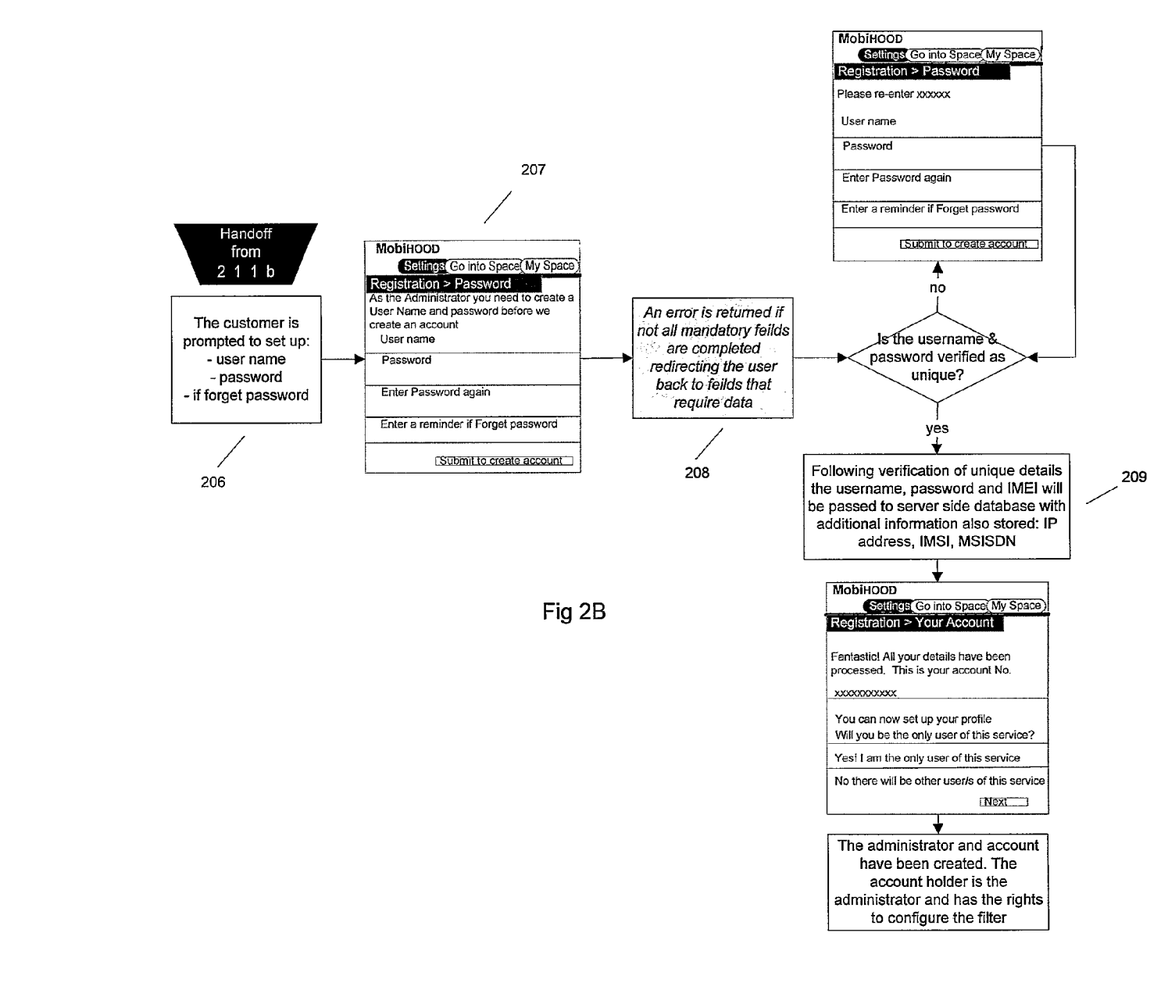
FIG. 2B shows a flow diagram of a second set of steps required in registering the client side application of the first embodiment.

Once the username and password have been selected by the administrator, these details are submitted to the server device (101) for processing to determine if the username and password are unique. If they are not unique, or do not adhere to a correct format, then an error message will be displayed on the user indicating that the selected username and/or password have been rejected and the prompting the administrator to try submitting a new username and/or password. The step of displaying an error message is indicated at block (208).

If the username and password are acceptable, then these details are stored in the second database (105) of the server device (101) as indicated at block (209). The client-side application will also store the information in the mobile phone memory.

Figure 2C:
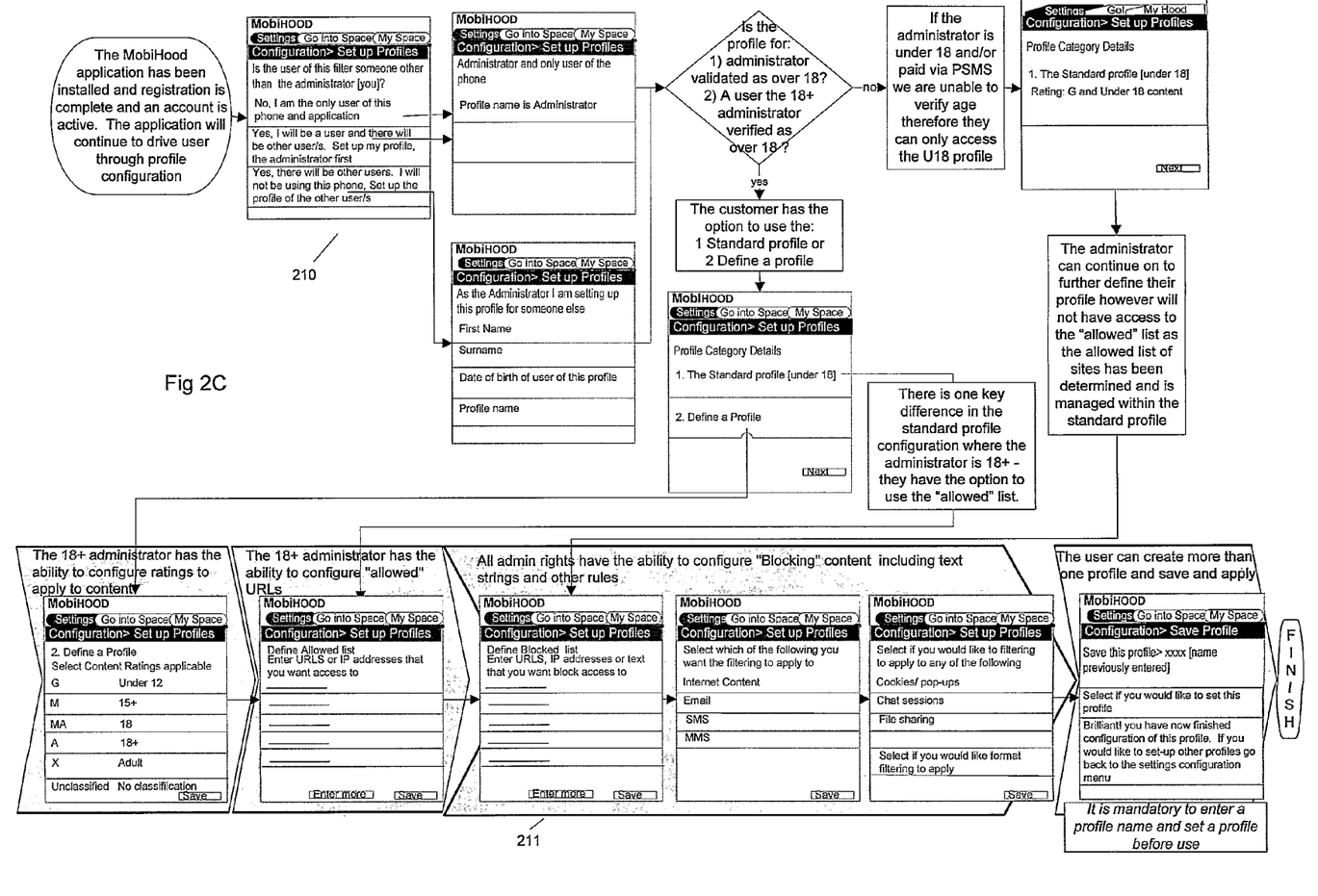
FIG. 2C shows a flow diagram of a third set of steps required in registering the client side application of the first embodiment.

Thereafter, the administrator is prompted to provide details of additional users of the mobile phone (100), if any, as indicated at block (210) of FIG. 2C. The personal details of each additional user are submitted for storing on the client-side application and the server device (101) by the administrator submitting an appropriate form via the browser.

As shown at blocks (211), the administrator is able to create up to 4 user-access settings for the mobile phone (100), one of which is able to be implemented on the mobile phone (100) at any given time. In this example, there will be only 4 users of the mobile phone at all times, including the administrator. This means that the administrator will be required to set up his own user-access setting as well as the 3 remaining user-access settings wherein each user-access setting will be set by the administrator to apply whenever a specific user is using the mobile phone (100).

Each user-access setting defines the scope of access to human-readable content that is available to its corresponding user. Each user-access setting includes a content rating component and a content category component. The content rating component can be defined by a number of possible ratings such as "G", "M", "MA", "R", and "X". The user-access setting also includes a content category which defines the subject matter of content that is able to be viewed by the user. The available content categories include "News", "Sport", "Weather", "Banking", "Gambling", "Adult Entertainment", and "General". Thus, in creating a user-access setting via the browser interface, the administrator will be prompted to flag certain content rating(s) and/or content category(s) as either being allowable or disallowable in respect of the user-access setting in question.

The administrator also has the ability to define an allowed content list and a disallowed content list for each user access setting. Each allowed content list is able to store up to 50 entries including IP addresses, URLs and text strings. The disallowed content list is also able to store up to 50 entries including IP addresses, URLs and text strings. It will be explained later how the allowed and disallowed content lists are used to effect content filtering on the mobile phone (100). Users may be able to edit their allowed and disallowed content lists with authorisation from the administrator. In this embodiment, only the administrator is permitted to edit the user access settings of users that are under the age of 18 years of age.

The first embodiment also involves the creation of a client-side active list which includes up to a maximum of 100 entries consisting of URLs and/or IP addresses, as well as a content profile for each of the entries in the list. The client-side active list is stored in a cache memory of the mobile client device. Each entry in the client-side active list includes the following:
(a) a URL or IP address of a recently accessed web site; and
(b) a content profile associated with the URL or IP address;
(c) a timestamp indicative of the time at which the web site was last accessed;

The content profile associated with each of the entries in the client-side active list are defined by reference to content category(s) and content rating(s) in a similar manner to how user-access settings are defined—that is, for each URL or IP address in the list, the content profile will selectively associate content ratings ("G", "M", "MA", "R", and "X") and content category(s) ("News", "Sport", "Weather", "Banking", "Gambling", "Adult Entertainment", and "General") with that IP address or URL.

In certain embodiments, each entry in the client-side active list will also store actual human-readable data from the actual web-site indicated by the IP addresses or URLs contained in an entry. Initially, the client-side active list will be empty. However, after a first web site has been accessed on the mobile phone (100), the client-side active list is updated. This will be explained in greater detail later when the implementation of the content filtering is discussed.

Meanwhile, the server device (101) also maintains a server-side list of web sites identified by their IP address or URL. The server-side list is compiled and updated manually by a central body which is charged with inspecting various Internet web sites accessible via the communication network and then arbitrarily defining the content profile for each inspected web site. For instance, the web site www.espn.com could be flagged as falling within the "sport" category as well as being assigned a "G" content rating. In some cases, Web site proprietors and web site content providers will be able to define their own content profiles and have these stored into the server device server-side list. It will be explained later how the server-side list is used to assist in content filtering by the client-side application. The server-side list is stored in the first database (104) of the server device (101).

Figure 3:
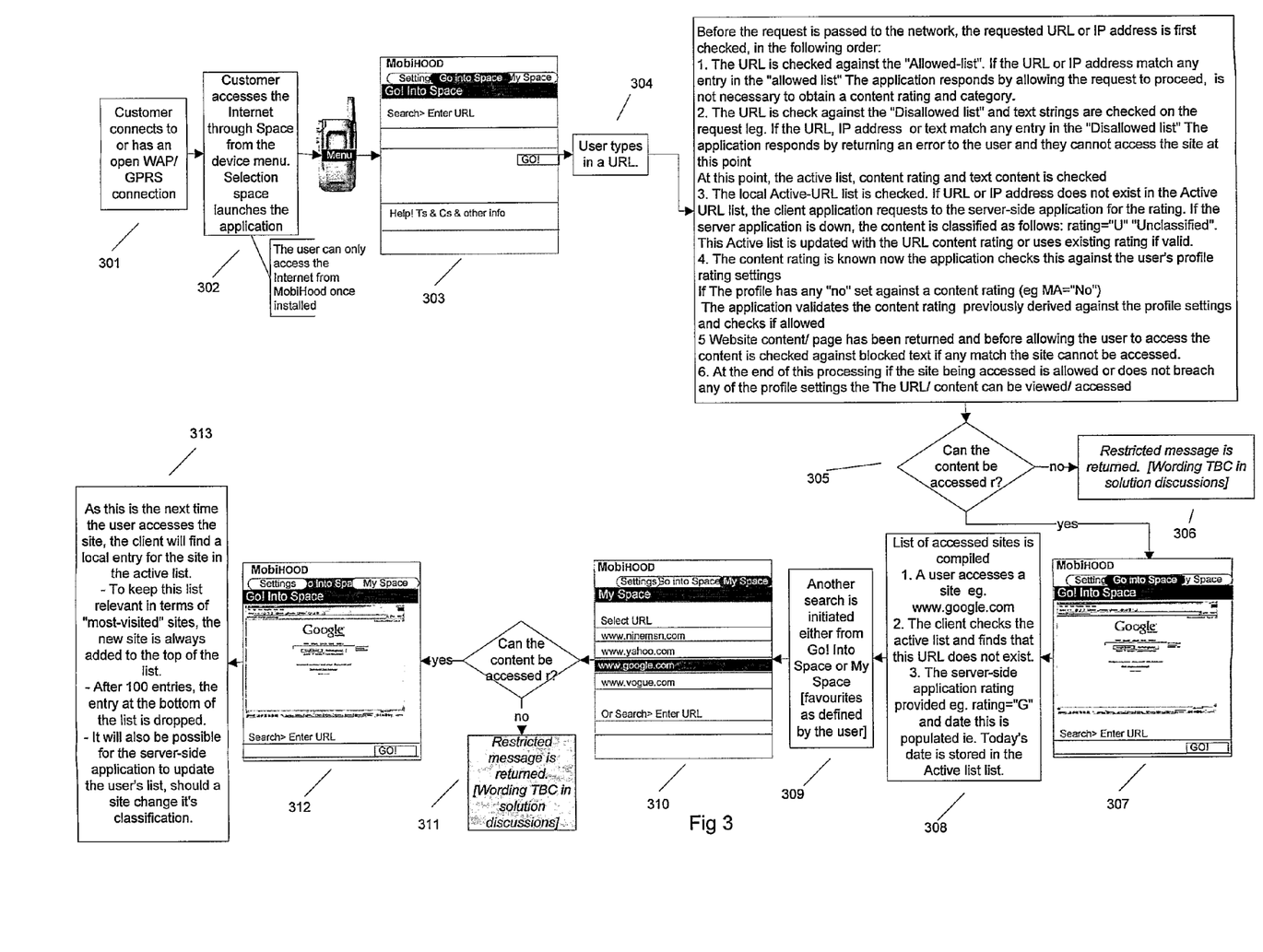
FIG. 3 shows a flow diagram of steps involved in using the first embodiment.

An example of the first embodiment system in use will now be briefly described with particular reference to FIG. 3. Firstly, at step (301), a user will establish a WAP connection over GPRS between the mobile phone (100) and the WAP gateway (103) as shown. The WAP connection can be initiated automatically when the user launches the client-side application WAP browser on the mobile phone (100) in preparation for accessing WAP sites available on the Internet (106) as indicated at block (302). An example screenshot of the client-side application browser interface is shown at block (303) when it is first launched by the user on the mobile phone.

Thereafter, at block (304), the user will enter a URL or IP address into the address bar of the client-side application browser running on the mobile phone (100). The application plug-in inspects the packet header information containing the outgoing IP request and processes the IP address by determining whether it meets an access criteria as indicated at block (305). If the received IP address input it does meet the access criteria, then the web site indicated by the IP address, in this case www.google.com, is displayed by the browser of the mobile phone (100) as shown at step (307). If however the IP address fails to meet the access criteria, then an error message is displayed on the mobile phone browser to alert the user to the denial of access, as shown at (306).

Figure 4:
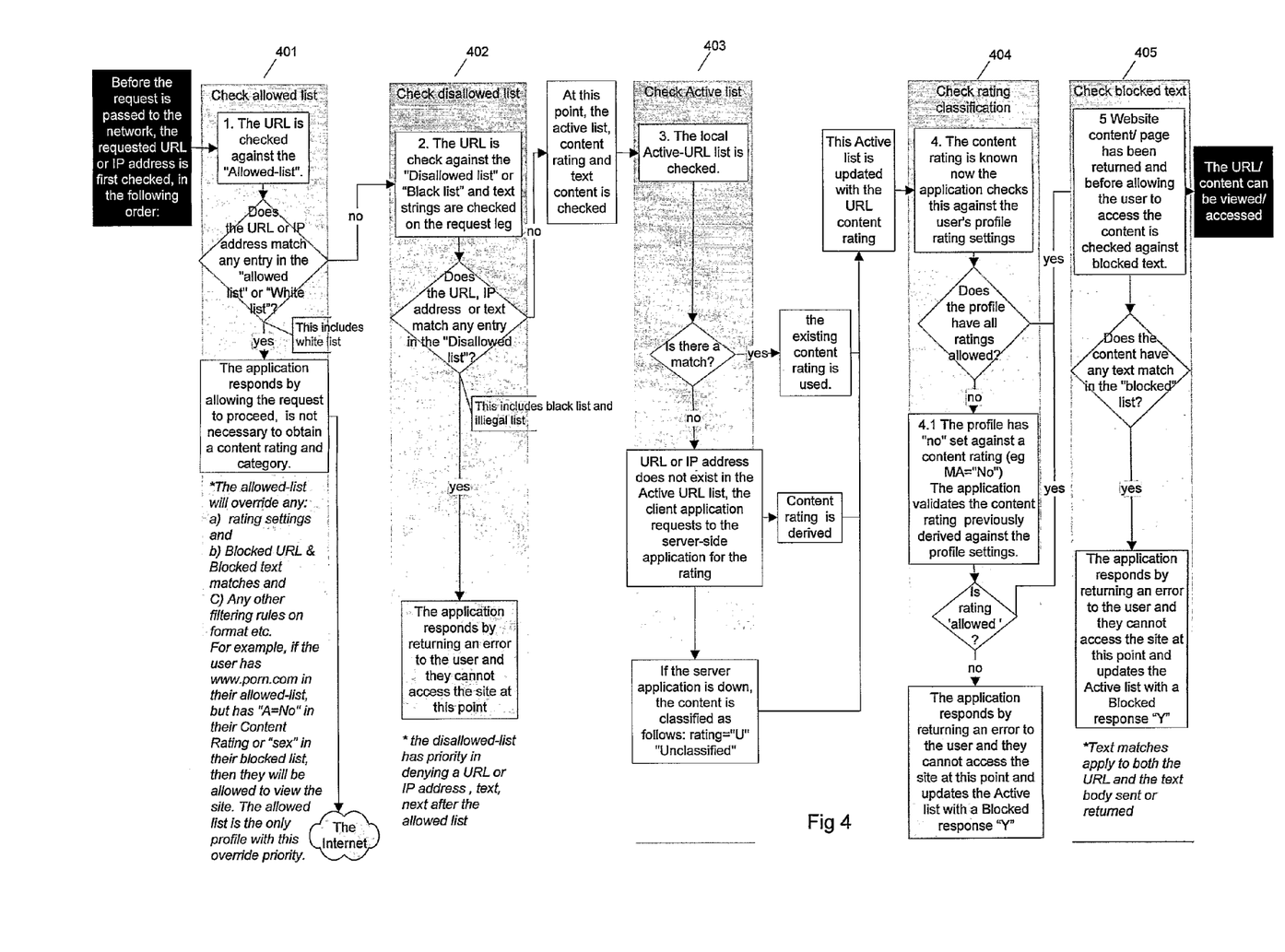
FIG. 4 shows a flow diagram of key steps involved in determining if an IP address of a web site requested for viewing by a user on the mobile phone meets an access criteria.

The step of applying the access criteria to the received IP address at (305) involves the following sub-steps which are described in further detail in FIG. 4.

Step (I) as Indicated at Block (401)

The client-side application determines if the IP address matches an entry in the allowed content list of the user access setting of the current user. If the IP address does match an entry in the allowed content list, then access is provided to the human-readable content from the web site that is indicated by the IP address automatically.

Step (II) as Indicated at Block (402)

In the event that the IP address is not matched to any entries in the allowed content list, the mobile phone (100) determines if the IP address matches an entry in a disallowed content list.

If this is the case then access is automatically disabled to the human-readable content on the web site indicated by the IP address. In the event that the IP address does match an entry in the disallowed list, a message is displayed on the mobile client device advising the user that access has been denied.

Step (III) as Indicated at Block (403)

Thereafter, if the IP address does not match an entry in the disallowed content list, then the client-side application determines if the IP address matches an entry in the client-side active list.

If the IP address does match an IP address of an entry in the client-side active list, then the content profile of the entry is then compared against the user access setting of the user. If the content profile of the entry is consistent with the user-access setting then access is provided to the web site. However, the client side application must also check the timestamp of the list entry to determine whether it is up-to-date. In this embodiment, an entry is treated as being up-to-date if the timestamp indicated falls within the last 30 days. Any entries which have timestamps of greater than 30 days are considered to be unreliable and the server device (101) must be queried to determine if the content profile for that IP address has now changed.

Thus, if the timestamp does falls within the 30 days period, and if the content profile of the IP address as listed in the client-side active list is consistent with the user access settings of the user, then access is provided to the web site on the mobile phone (100). If however access is denied, then an error message is displayed on the browser of the mobile phone (100).

Step (IV) as Indicated at Block (404)

If however the timestamp does not fall within the 30 day timeframe, or, there is no entry at all within the client-side active list which matches the IP address, then the client-side application automatically queries the server device (101) to provide a content profile for the IP address.

The server device (101) responds to the query by first reviewing the server side list to see if an entry exists which refers to the specified IP address. If this is the case, then the server-side list sends the content profile for the IP address to the client-side application to update the client-side active list. The client-side application is thereafter able to determine whether the requested web site should be provided for access to the user by comparing the verified content profile with the user access setting for the user as per usual. Thus, if the verified content profile of the IP address retrieved from the server device (101) is allowable by reference to the user-access profile of the user, then the relevant web site is displayed on the mobile phone browser. Once again, if access is denied, then an appropriate message indicating the denied access is displayed on the browser.

In this embodiment, yet a further step is involved before permitting access to the web site content on the mobile phone. Upon receiving the content of the web site on the mobile phone, the client-side application will compare text strings in the content against entries in the disallowed content list of the current phone user's user access setting. If any text within the received web site content matches a text string in any entry in the disallowed content list, then access to the web site will further be denied. This is indicated by block (405).

If there is no entry in the server-side list corresponding to the queried IP address, then message is sent to the client-side application that the IP address is "unclassified". Also, when the server device (101) is unavailable, then the IP address is also automatically designated as being "unclassified" by the client-side application.

In this embodiment, the steps (I) to (IV) are applied in numerical order. Also, if in implementing step (I) above, it is determined that the IP address matches an entry in the allowed content list, then access is provided to the human readable content regardless of whether access would be denied in accordance with any one of steps (II)-(IV). Steps (II)-(IV) are not required to be performed once it is determined in accordance with step (I) that access is to be enabled.

Referring once again to FIG. 3, as indicated at block (308), every time a new web site is successfully accessed by the user, the client-side active list is inspected to determine if the web site IP address is already contained in an entry in the list. If the IP address is not contained in an entry in the list, or, if an entry in the list does contain the IP address but the timestamp of the entry falls outside the predefined time period (eg. 30 days), then a new entry is created for the IP address with a timestamp accurately indicating the time that the web site was most recently accessed. When the client side active list reaches its limit of 100 entries, the entry in the client-side active list having the oldest existing time stamp associated with it is discarded and the most recently accessed web site details is stored in to the list in its place.

If the web site has been accessed due to the inclusion of the IP address in the allowed list without the client-side application actually knowing what the content profile is associated with the IP address, then client-side application will query the server side device for the content profile so that this information can be stored with a new entry in the client-side active list with the IP address.

The user may within 30 days, decide to once again visit the www.google.com site. For convenience, the browser enables the user to simply pull down the URL of the web site that the user intends to access from a list of "favourite" sites. An example screenshot of the pull down list displayed by the browser is shown in block (310) of FIG. 3.

Assuming that the IP address for www.google.com is not contained in the allowed or disallowed lists of the user's user-access setting, then the client-side application will eventually look in the client-side active list to determine if an entry matches the requested IP address of www.google.com. As it will be recorded in the client-side active list that the www-.google.com site was previously accessed within the past 30 days, the content profile of the site is compared again with the user-access setting and unless the user-access setting has been edited by an administrator to be more restrictive, then the www.google.com site should be readily displayed once again on the mobile phone browser as indicated by the example screenshot in block (312). If the user attempts to view the www.google.com site and the content profile has changed such that it is not allowable by reference to the user access setting, then an error message is displayed on the browser indicating that access is denied (311).

In this embodiment, the server device (101) is also adapted to dynamically update the client-side active list whenever a content profile for a given web site has been updated on the server device (101) and the web site also has a corresponding entry in the client-side active list. Typically, the update is "pushed" to the mobile phone (100) by the server device (101) to effect the update as indicated by block (313) in FIG. 3. The server device (10) maintains a log of entries currently stored in client-side active lists for each mobile phone (100) connected to the server device (101) so that updates can be pushed to appropriate mobile phone (100) accordingly.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

The invention claimed is:

1. A method of controlling access to content from a mobile client device, the mobile client device being communicably connected to a server device via a communication link, and the method including the steps of:
   (i) receiving in the mobile client device, an input indicative of the content, wherein the input received in the mobile client device is not pre-formatted or pre-tagged with a content-rating information, and wherein the content includes human-readable content, and wherein the mobile client device includes at least one of:
      (a) a mobile phone; and
      (b) a PDA;
   (ii) thereafter, processing the received input, wherein said processing includes the mobile client device determining if the received input meets an access criteria, whereby the mobile client device selectively provides access to content if the access criteria is determined to have been met, wherein when determining if the received input meets the access criteria, at least one of the following sub-steps are performed:
      (a) the mobile client device determining if the received input matches an entry in an allowed content list, whereby if the received input does match an entry in the allowed content list, then access is enabled to the human-readable content indicated by the received input data via the mobile client device;
      (b) the mobile client device determining if the received input matches an entry in a disallowed content list, whereby, if the received input does match an entry in the disallowed content list, then access is disabled to the human-readable content indicated by the received input data via the mobile client device;
      (c) the mobile client device determining if the received input matches an entry in a client-side active list indicative of content that has been accessed relatively recently on the mobile client device, wherein if the received input does match an entry in the client-side active list, and, a content profile associated with the matched entry is determined to be allowable by reference to a pre-defined user access setting, then access from the human-readable content indicated by the received input is enabled;
      (d) the mobile client device querying the server device, wherein in response to the query, the server device is adapted to:
         (I) receive the input indicative of human-readable content from the mobile client device; and
         (II) determine if the received input matches an entry in a server-side active list, wherein, if the received input matches an entry in the server-side active list, and, a content profile associated with the matched entry is allowable by reference to the pre-defined user access setting, then access to the human-readable content indicated by the received input is enabled from the mobile client device.

2. A method as claimed in claim 1 wherein the received input includes at least one of:
   (a) a URL;
   (b) an IP address;
   (c) a text string;
   (d) a title of an image file;
   (e) a title of a video file;
   (f) a title of an audio file.

3. A method as claimed in claim 1 wherein the communication link includes a wireless network.

4. A method as claimed in claim 3 wherein the wireless network includes a packet-switched mobile network.

5. A method as claimed in claim 1 wherein the mobile client device includes a processor, an operating system executable on the processor, and, a memory store for storing a client-side application executable on the processor.

6. A method as claimed in claim 5 wherein the client-side application is programmed to provide at least one of:
   (a) a means of receiving input data;
   (b) a data packet inspector for use in inspecting data at the TCP/IP level;
   (c) a means of processing the received input when determining if the received input meets the access criteria, whereby access to human-readable content indicated by the received input is selectively enabled and/or disabled from the mobile client device by reference to the determination.

7. A method as claimed in claim 5 wherein at least one of the allowed content list, the disallowed content list, and, the client-side active list are stored in the memory store of the mobile client device.

8. A method as claimed in claim 5 including the step of providing a plurality of user access settings any one of which is able to be selected for operation on the mobile client device at any given time.

9. A method as claimed in claim 8 wherein each of the plurality of user access settings include unique allowed content lists and disallowed content lists.

10. A method as claimed in claim 9 including the step of downloading the client-side application to the mobile client device.

11. A method as claimed in claim 10 including the step of registering use of the client-side application before the client-side application is operable.

12. A method as claimed in claim 11 including the step of establishing an administrator of the mobile client device, wherein the administrator includes a person responsible for registering the client-side application.

13. A method as claimed in claim 12 wherein the plurality of user access settings are pre-defined by the administrator.

14. A method as claimed in claim 12 wherein only the administrator is authorised to edit at least one of:
   (a) the allowed content list(s);
   (b) the disallowed content lists(s);
   (c) the plurality of user-access setting(s).

15. A method as claimed in claim 1 wherein the server device includes a processor, an operating system executable on the processor, and, a memory store for storing a server-side application executable on the processor.

16. A method as claimed in claim 15 wherein the server-side active list is stored in the memory store of the server device.

17. A method as claimed in claim 1 wherein the server device includes a database.

18. A method as claimed in claim 1 wherein the server device includes a WAP gateway.

19. A method as claimed in claim 1 wherein the steps (a)-(d) are performed in consecutive order.

20. A method as claimed in claim 1 wherein the step (b) is performed only if in step (a), the received input does not match an entry in the allowed content list.

21. A method as claimed in claim 1 wherein the step (c) is performed only if in step (b), the received input does not match an entry in the disallowed content list.

22. A method as claimed in claim 1 wherein at least one of the allowed content list and the disallowed content list are editable.

23. A method as claimed in claim 1 wherein entries in the allowed content list and/or disallowed content list include at least one of:
    (a) a URL;
    (b) an IP address;
    (c) a text string;
    (d) a title of an image file;
    (e) a title of a video file;
    (f) a title of an audio file.

24. A method as claimed in claim 23 wherein entries in the client-side active list also include human-readable content indicated by the URL and/or IP address contained in the entry.

25. A method as claimed in claim 1 wherein entries in the client-side active list include at least one of:
    (a) a URL or IP address indicative of a recently accessed web site;
    (b) a content profile associated with the URL or IP address;
    (c) a timestamp indicative of a time at which the web site was accessed.

26. A method as claimed in claim 25 wherein the content profile of an entry in the client-side active list includes at least one of a content rating and a content classification.

27. A method as claimed in claim 26 wherein the content classifications include at least one of the following:
    (a) news;
    (b) weather;
    (c) sport;
    (d) adult content;
    (e) pornography;
    (f) banking;
    (g) gambling; and
    (h) entertainment.

28. A method as claimed in claim 26 wherein the content ratings include a plurality of codes, each code being representative of particular age group of viewers suitable for viewing content associated with the code, and/or, a nature of the content bearing the given code.

29. A method as claimed in claim 28 wherein the content ratings are based upon a content regulation system implemented by a governmental body.

30. A method as claimed in claim 25 wherein if the received input matches an entry in the client-side active list but the timestamp associated with the matched entry falls outside of a threshold timeframe, then the server device is queried for an updated content profile.

31. A method as claimed in claim 30 wherein step (d) of claim 12 is performed only if at least one of the following conditions are met:
    (a) the received input does not match any entry in the client-side active list; or
    (b) the timestamp of an entry in the client-side active list matching the received input falls out side the threshold timeframe.

32. A method as claimed in claim 30 wherein the threshold timeframe includes a period of 30 days.

33. A method as claimed in claim 1 wherein the client-side active list includes a maximum capacity of 100 entries.

34. A method as claimed in claim 1 wherein the client-side active list is stored in a cache of the mobile client device.

35. A method as claimed in claim 1 including the step of updating the client-side active list whenever access to a web site is enabled, whereby said step of updating the client-side active list includes creating a new entry in the client-side active list associated with the accessed web site and/or a timestamp indicative of the time at which the web site was accessed.

36. A method as claimed in claim 35 wherein the step of updating the client-side active list includes the mobile client device querying the server device for a pre-defined content profile associated with the web site that is to be included in the client-side active list, said pre-defined content profile being stored in a memory store of the server device.

37. A method as claimed in claim 36 including the step of automatically updating the content profiles of entries in the client-side active list including at least one of:
    (a) the mobile client device pulling updated content profile information from the server device; or
    (b) the server device pushing updated content profile information to the mobile-client device.

38. A method as claimed in claim 37 wherein the user access setting includes at least one of:
    (a) a reference to at least one content classification; and/or
    (b) a reference to at least one content rating.

39. A method as claimed in claim 38 wherein the content profile of a web site is allowable by reference to the user access setting if the content classification and/or content rating indicated in the user access setting matches the content classification and/or content rating in the content profile of an entry in the client-side active list.

40. A method as claimed in claim 1 including the step of providing a black-list of web sites which are not accessible at any time from the mobile client device, wherein said black-list over-rides the allowed content list(s).

41. A method as claimed in claim 40 including the step of providing a white-list of web sites which are always accessible at any time from the mobile client device, except where the web site is referred to in the black-list.

42. A method as claimed in claim 41 including a step preceding step (a) in claim 1, whereby the preceding step includes:
    (a) determining if the received input matches an entry in the black-list, wherein if the received input does match an entry in the black-list, then access to the content indicated by the received input is disabled; and/or
    (b) if the received input does not match an entry in the black-list, then determining if the received input matches an entry in the white-list, wherein if the received input does match an entry in the white-list, then access to the content indicated by the received input is enabled.

* * * * *